United States Patent [19]

Conti

[11] 4,041,761
[45] Aug. 16, 1977

[54] PREPACKAGED GUARD DEVICE SUB-ASSEMBLY FOR PRESSURE RESPONSIVE INSTRUMENTS

[75] Inventor: Jack Conti, Norwalk, Conn.

[73] Assignee: Dresser Industries, Inc., Dallas, Tex.

[21] Appl. No.: 693,614

[22] Filed: June 7, 1976

[51] Int. Cl.² ............................................. G01L 7/08
[52] U.S. Cl. ...................................... 73/420; 73/392; 73/395; 73/406
[58] Field of Search ................. 73/420, 395, 392, 431, 73/411–416, 406

[56] References Cited

U.S. PATENT DOCUMENTS

| 533,233 | 1/1895 | Pratt | 73/420 |
|---|---|---|---|
| 2,216,374 | 10/1940 | Martin | 73/420 |
| 2,679,760 | 6/1954 | Harland et al. | 73/395 |
| 3,808,890 | 5/1974 | Neugebauer | 73/395 |

Primary Examiner—Donald O. Woodiel
Attorney, Agent, or Firm—Daniel Rubin

[57] ABSTRACT

A prepackaged pressure responsive diaphragm sub-assembly of the flange type for isolating a pressure sensitive instrument from the source of fluid pressure at a connection with which the instrument is to be utilized. Comprising the sub-assembly unit is an annular diaphragm retained prepackaged in operative relation sandwiched between a housing and an open ended sleeve having an end face adapted for gasket sealed installation with a match-up sleeve provided by the end user. Securing the assembly are L-shaped fasteners supported in an annular flange mounted about the housing and gripping a shoulder formed on the sleeve. Displaced in the flange from the fasteners are bolt holes enabling installation to a flange on the user's pressure source connection while maintaining the prepackaged operative relation of the sub-assembly.

2 Claims, 5 Drawing Figures

PREPACKAGED GUARD DEVICE SUB-ASSEMBLY FOR PRESSURE RESPONSIVE INSTRUMENTS

BACKGROUND OF THE INVENTION

1. The field of art to which the invention pertains includes the art of expansible chamber devices.

2. The use of guard devices for protecting pressure gauges or other forms of pressure responsive instruments such as indicators, recorders, transmitters, etc. for direct fluid contact of the pressure source are well known and are available from a variety of commercial sources. Typically, such guards are employed to prevent injury to the instrument from over-pressure, corrosion, freezing, sediment plugging or the like. Exemplifying guard devices of the prior art are those disclosed in U.S. Pat. Nos. 3,202,063 and 2,839,087.

In a common threaded type construction, guard devices of the proir art include a flexible diaphragm secured between bolt assembled upper and lower housings each defining a fluid passage communicating with the upper and lower faces, respectively, of the diaphragm. A fluid inlet in the lower housing is usually formed as a small diameter tapped opening for connecting a threaded pipe to the pressure source with which the instrument is to be utilized, while the outlet is similarly tapped for connection of the instrument. Flange type constructions are similarly available in which the diaphragm is secured between matched flanges that can also be used for matchup installation purposes.

To accommodate installation, such prior art threaded type devices are frequently sold as loose components assembled on site or alternatively assembled when sold but requiring disassembly during installation for making the threaded source connection to its inlet. By contrast, the flange type does not usually require disassembly except for removal of a flange face protector provided during shipment. However, because the lower mounting flange of such flange type constructions are "wetted", i. e. directly exposed to the pressured fluid, it has been customary to manufacture at least that flange of costly corrosion resistant metals. Consequently, guard devices of the prior art have been generally characterized as either subject to loose or misplaced parts causing inconvenient and even improper installation and/or of costly manufacture. Despite recognition of the foregoing problems, a ready solution has not heretofore been known.

SUMMARY OF THE INVENTION

This invention relates to a flange type guard device for pressure instruments and specifically to a novel sub-assembly thereof for isolating pressure sensitive instruments from the pressure source with which they are to be utilized while effectively transmitting pressure changes therebetween. Like similar purpose flange type devices of the prior art, the sub-assembly guard device hereof has no loose parts and can be prepackaged and shipped in assembled operative relation without need to disassemble for purposes of installation. Yet, unlike prior art constructions the guard device hereof affords substantial savings in manufacturing cost by enabling a significant reduction in the quantity of required corrosion resistant metals as compared to such previous constructions.

This is achieved in accordance herewith by forming the diaphragm unit as a prepackaged sub-assembly in which an annular diaphragm is peripherally retained sandwiched in prepackaged operative relation between a housing and a corrosion resistant sleeve by flange supported L-shaped fasteners positioned about the assembled periphery. The sleeve includes an end face for user matchup while the housing supported annular flange also includes bolt apertures enabling direct installation with a user's matchup flange. Since the corrosion resistant sleeve lacks the mass of the corrosion resistant mounting flange previously utilized, there results a comparative low cost of manufacture for such units.

It is, therefore, an object of the invention to provide a novel guard device for isolating a pressure responsive instrument from its source of fluid pressure.

It is a further object of the invention to provide a novel flange type guard device as in the previous object that is prepackaged as a sub-assembly with the components thereof in their operative relation while affording significant savings in manufacturing costs as compared with similar purpose constructions of the prior art.

Figure 1:
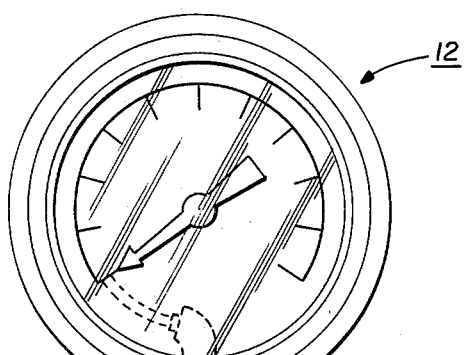
FIG. 1 is an elevation view of the guard device hereof in its installed relation.

Referring now to the drawings, the sub-assembly guard device in accordance herewith is designated 10 and is shown in FIG. 1 in its operative installed relation between a pressure gauge 12 and a user's matchup flange 14 (in phantom) completing the assembly for connecting to a source of pressure with which gauge 12 is to be responsive.

Figure 3:
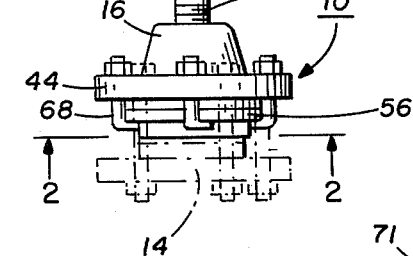
FIG. 3 is a sectional elevation taken substantially along the lines 3—3 of FIG. 2.
Figure 3:
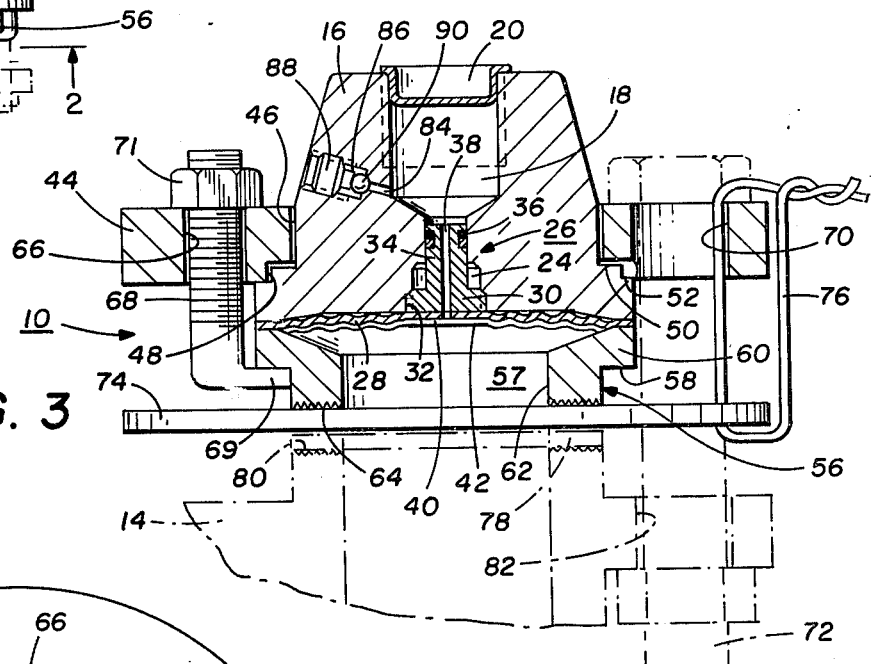
Figure 2:
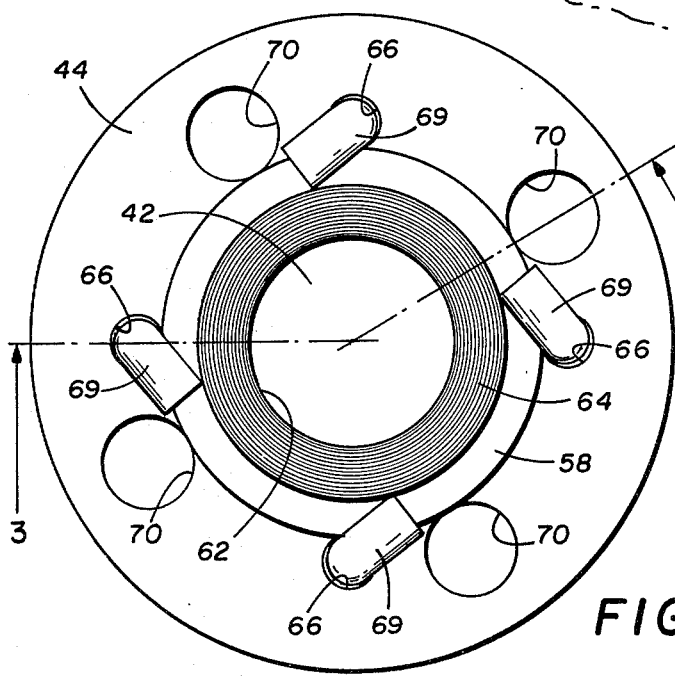
FIG. 2 is an enlarged underside plan view as seen substantially along the lines 2—2 of FIG. 1.

With more specific reference to FIGS. 2 and 3, guard device 10 hereof is illustrated in its prepackaged shipping relation. Comprising the guard device is a top housing 16 having a centrally threaded upper outlet passage 18 containing a plug 20 for purposes of shipping and which is to be removed on installation to receive the threaded nipple 22 of gauge 12 (FIG. 1). Communicating at the underside of passage 18 is an inlet passage 24 of reduced bore diameter containing a diaphragm capsule 26 which may, for example, be of a type disclosed in U.S. Pat. No. 3,202,063 mentioned supra positioned contiguously subtended against the underside of housing 16. Laterally extending outward of housing 16 from passage 18 is a small diameter bore 84 communicating with counterbore 86. A plug 88 is screw fitted against a ball 90 for sealing in fluid after filling.

Briefly, diaphragm capsule 26 is comprised of a backing member or plate 28 provided with a rigid axial hub 30 threaded at 32 for screwed mounting within the bore of passage 24. Alternatively, the capsule can be either clamped or welded to the underside of housing 16. A cylindrical stem portion 34 of reduced diameter is encircled by a conventional O-ring 36 for effecting a sealed relation with the passage. Small diameter internal bore 38 communicates on its underside with an open chamber 40 defined between backup plate 28 and a flexible diaphragm 42. Such capsules operate in a well known manner to transmit pressure changes exerted against the underside of diaphragm 42 through passage 18 to the connected gauge 12.

Supported subtending the diaphragm is a more or less short length annular sleeve 56 of corrosion resistant metal such as stainless steel having a relatively large central passage opening 57 for exposing diaphragm 42 to inlet pressure in a well known manner. Defined on the sleeve periphery intermediate its ends is a radial shoulder 58 forming the underside of flange portion 60. The lower end face of sleeve 56, for reasons as will be understood, includes a plurality of concentric grooves 64 appearing serrated in section.

For securing the prepackaged operative relation of the subassembly hereof comprising housing 16, diaphragm capsule 26 and sleeve 56, there is employed an annular body flange 44 of bore diameter 46 sufficient to clear the periphery of housing 16 and counterbored at 48 for seating atop housing shoulders 50 and 52. Included in body flange 44 are a plurality of equally spaced relatively small diameter apertures 66 and a plurality of similarly spaced relatively large diameter apertures 70. Within apertures 66 are contained L-shaped fasteners 68 having a threaded shank for receiving nut 71 and a foot 69 engaging the underside of sleeve shoulder 58. Bolt holes 70 are provided to receive user's bolts 72 (in phantom—FIG. 3) for effecting installation with the user's matchup flange 14. When so assembled for shipping, plug 20 is provided to protect passage 18 while a cover plate 74 is held in place by tag wire 76 for protecting both the underface 64 of sleeve 56 and to prevent dirt from entering passage 57.

Figure 4:
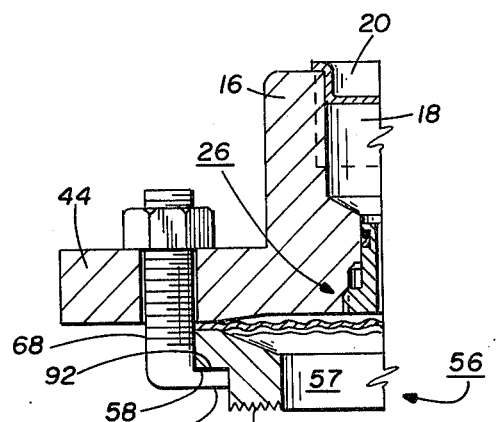
FIGS. 4 and 5 are fragmentary sections illustrating alternative constructions to that of FIG. 3.
Figure 5:
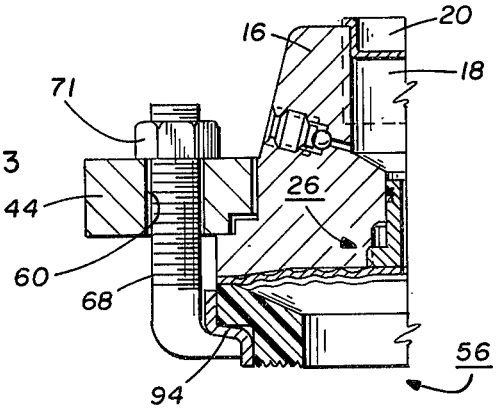

In the alternative arrangement of FIG. 4, the step shoulders 50 and 52 of the previous embodiment are omitted from the housing which instead is formed as a on-piece construction with body flange 44. This arrangement has the advantage of further reducing both size and weight of housing 16 enabling a yet more compact sub-assembly to be effected. Optionally, foot 69 can be welded at 92 to shoulder 58. Where corrosion resistant sleeve 56 is of Teflon or other suitable plastic composition, it may be preferably as shown in FIG. 5 to utilize a metal liner 94 intervening between foot 69 and shoulder 58.

To install guard device 10 in accordance herewith, it is, of course, necessary to first discard shipping plate 74. The entire sub-assembly is then placed in seating relation overlying an annular resilient ring gasket 78 (in phantom) provided by the end user in turn overlying concentric grooves 80 or other suitable construction in the end face of the user's matchup sleeve flange 14 for effecting a leakproof joint thereat. Like flange 44, sleeve flange 14 includes a plurality of bolt apertures 82 in corresponding spaced alignment with apertures 70 such that the units can be drawn together via bolts 72 for completing installation. Since guard device 10 is maintained integrally assembled in its prepackaged sub-assembly relation not requiring disassembly in order to effect installation to the user's service, installation is substantially simplified in that insertion of only bolts 72 are required. This enables installation to be completed in a matter of seconds. At the same time, without a mounting flange associated with the construction of sleeve 56, the material and consequently the manufacturing costs thereof are significantly less that that previously incurred.

By the above description there has been disclosed a novel flange type guard device for isolating a pressure sensitive instrument from a source of fluid pressure with which the instrument is to be utilized. By a novel sub-assembly form of prepackaging, installation of the unit is substantially enhanced in that shipment is enabled in assembled formation which is retained in the course of installation while at the same time enjoying a lower cost of manufacture as compared with the prior art.

Since many changes could be made in the above construction and many apparently widely different embodiments of this invention could be made without departing from the scope thereof, it is intended that all matter contained in the drawings and specification shall be interpreted as illustrative and not in a limiting sense.

The embodiments of the invention in which an exclusive property or privilege is claimed are defined as follows:

1. A subcombination flange type guard apparatus for a pressure sensitive instrument comprising in combination:
    a. a housing defining a central passage extending between an inlet for receiving a pressure change communicated from a connected fluid source and outlet for communicating with a pressure sensitive instrument;
    b. a diaphragm supported contiguously subtending said housing adapted to be exposed at its underside to a connected fluid source for transmitting pressure changes of the fluid source through said housing passage;
    c. a passage defining annular sleeve of non-metallic composition positioned with one end contiguous to said diaphragm oppositely of said housing, said sleeve defining a gasket sealing surface at its free end surrounding its passage and a radially extending annular shoulder at an intermediate location peripherally between its ends;
    d. securement means securing said housing, diaphragm unit and sleeve as a prepackaged sub-assembly in their operative relation to each other, said securement means including an annular mounting flange encircling said housing and L-shaped threaded fasteners mounted angularly displaced in said flange and each having a foot by which to grip the underside of said shoulder in securing said diaphragm in sandwiched relation between said sleeve and said housing;
    e. installation means provided for enabling said sub-assembly to be installed into sealed relation with a pressure source while maintaining the operative relation effected by said securement means, said installation means comprising a plurality of bolt apertures defined in said mounting flange displaced from said fasteners for receiving bolts capable of securing the sealing face of said sleeve into sealing relation with a received gasket and matchup sleeve at the pressure source; and
    f. a metallic liner positioned intervening between the foot of said fasteners and the underside of said sleeve shoulder.

2. A guard apparatus according to claim 1 in which the sealing end surface of said sleeve is comprised of a plurality of concentric recesses defined therein.

* * * * *